(12) United States Patent
Hudack et al.

(10) Patent No.: US 9,262,610 B2
(45) Date of Patent: Feb. 16, 2016

(54) IMPOSTER ACCOUNT DETECTION AND REMEDIATION IN A SOCIAL NETWORKING SYSTEM

(71) Applicant: Facebook, Inc., Menlo Park, CA (US)

(72) Inventors: Michael Hudack, San Francisco, CA (US); Samuel Lessin, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 387 days.

(21) Appl. No.: 13/748,474

(22) Filed: Jan. 23, 2013

(65) Prior Publication Data

US 2014/0208424 A1 Jul. 24, 2014

(51) Int. Cl.
*H04L 29/06* (2006.01)
*G06F 21/31* (2013.01)

(52) U.S. Cl.
CPC ............ *G06F 21/316* (2013.01); *H04L 63/102* (2013.01); *H04L 63/1441* (2013.01); *G06F 2221/2111* (2013.01)

(58) Field of Classification Search
None
See application file for complete search history.

(56) References Cited

U.S. PATENT DOCUMENTS

| 8,225,413 | B1* | 7/2012 | De et al. ........................... 726/26 |
| 8,856,922 | B2* | 10/2014 | Rubinstein et al. .............. 726/22 |
| 2012/0072493 | A1* | 3/2012 | Muriello et al. ............... 709/204 |
| 2012/0144016 | A1* | 6/2012 | Zhang et al. ................... 709/224 |
| 2015/0082448 | A1* | 3/2015 | Elovici et al. .................... 726/26 |

* cited by examiner

*Primary Examiner* — Jeffery Williams
(74) *Attorney, Agent, or Firm* — Fenwick & West LLP

(57) ABSTRACT

When a request to connected a requesting user to a target user is received by the social networking system, information associated with the requesting user and with users connected to the target user is retrieved. A fraud probability score indicating a probability that the requesting user is impersonating a user connected to the target user is determined based on the information associated with the requesting user and with users connected to the target user. Based on the fraud probability score, a determination is made whether the requesting user is a suspected imposter and remedial action is taken if imposter is suspected.

25 Claims, 2 Drawing Sheets

IMPOSTER ACCOUNT DETECTION AND REMEDIATION IN A SOCIAL NETWORKING SYSTEM

BACKGROUND

This invention relates generally to social networking systems, and in particular to the detection and remediation of imposter accounts in a social networking system.

Social networking systems allow users to create accounts that are tied to their identities. The users may be individuals or entities such as corporations or charities. Using their user accounts, users connect to other social networking system users and share information with other social networking system users. However, a user may create an account duplicating an account of another user (an "impostor account') to impersonate another person or entity. The impostor account may be used to provide the appearance that the duplicated user endorses or provides content or for another purpose.

Conventionally, social networking systems manually review imposter accounts based on users reporting imposter accounts. Such a manual review process may require significant human resources and depends on users to identify and report impostor accounts. In recent years, the number of reported impostor accounts has made the management of these reports an overwhelming task.

More recently, account management processes have reduced the amount of human resources used when an imposter account is reported. These account management processes use algorithms to help automate determination of the likelihood that an account is fraudulent. However, conventional processes still require users to report imposter accounts before remedial action is taken. Hence, if a user does not realize an account is an imposter account, no remedial action is taken regarding the imposter account.

SUMMARY

A social networking system allows users to create accounts and establish connections other users. To create connections with users, a requesting user communicates a connection request to a target user via the social networking system. If the target user accepts the connection request, a connection between the target user and the requesting user is created by the social networking system. The target user often uses profile information and connections associated with the requesting user to determine whether to accept the request. Hence, a user may impersonate an additional user (the "impersonated user") connected to the target user by creating an account replicating the profile information and establishing connections replicating connections of the impersonated user. The more closely the profile information and connections of the created account matches the account of the impersonated user, the more difficult it is to distinguish the users, increasing the likelihood that the target user will believe the authenticity of the requesting user based on the created account and allow the connection.

Users impersonating other users raise privacy concerns, such a user sharing private information with unintended recipients. For example, if a requesting user impersonating another user establishes a connection with a target user, the requesting user may have access to more of the target user's personal information and able to more readily elicit private information from the unsuspecting target user. For example, based on the connection with the target user, the requesting user impersonating the other user may be able to message the target user the social networking system.

To prevent a user from impersonating another user, a social networking system determines if a requesting user is impersonating another user based on information associated with the requesting user. Information associated with the requesting user's profile, as well as information ascertained by the social networking system (such as the user's Internet Protocol address and/or geodata), is compared to information associated with user profiles of other users connected to the target user. Based on the comparison, the social networking system generates a fraud probability score indicating the likelihood that the requesting user is impersonating a user connected to the target user. In generating the fraud probability score, the social networking system may associate different weights with different types of information being compared. In various embodiments, the fraud probability score is determined based on matching information among the compared profiles, or is determined based on matching and differing information between the compared profiles.

If the fraud probability score indicates at least a threshold likelihood that the requesting user is impersonating a user connected to the target user, one or more actions may be taken. The action taken may be based on the fraud probability score. For example, the fraud probability score is compared to a threshold value. If the fraud probability score is less than the threshold value, the connection request is communicated to the target user. If the fraud probability score equals or exceeds the threshold value, the requested user is determined to be a suspected imposter and one or more actions may be taken by the social networking system. Examples of actions taken by the social networking system include: warning the target user of the suspected imposter, blocking the connection request, notifying the requesting user that the connection request was blocked, warning users connected to both the target user and to the requesting user that the requesting user may be an imposter, warning the user connected to the target user likely to be impersonated that another user may be impersonating them, including the requesting user's account in an account verification process, and/or deleting the requesting user's account. Alternatively, the action taken by the social networking system is determined based on the fraud probability score falling within certain ranges of fraud probability scores, with each range associated with one or more of actions, such as those described above. If ranges overlap, the social networking system may take one or more actions associated with the ranges.

Figure 1:
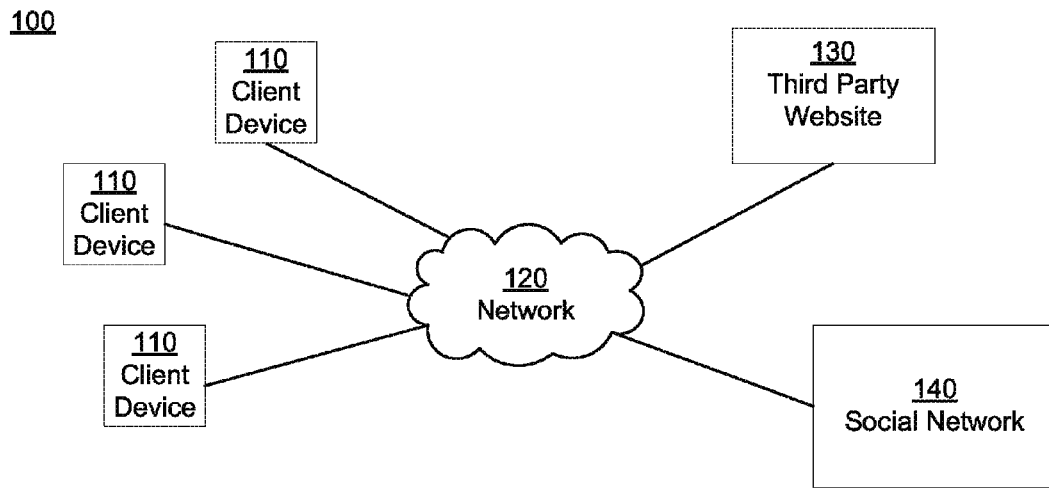
FIG. 1 is a block diagram of a system environment in which a social networking system operates, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows users to create profiles associated with the users' demographic information and other social information, such as connections to other users, subscriptions, etc. When the social networking system receives a request from a requesting user to establish a connection to a target user (a "connection request"), a fraud probability score is generated for the requesting user. The fraud probability score determines the likelihood that the requesting user is impersonating another user connected to the target user. Data associated with the profile of the requesting user is compared with data associated profiles of one or more users connected to the target user to determine the fraud probability score. Different types of data associated with profiles may be differently weighted when calculating the fraud probability score. For example, a determination that users have identical profile pictures may be weighted more heavily than a determination that the users attended the same college. In one embodiment, the fraud probability score is calculated using information common to the profiles. Alternatively, the fraud probability score is calculated based on information common to user profiles as well as information differing between user profiles.

Based on the fraud probability score, the social networking system determines whether to classify the requesting user as a likely impostor of a user connected to the target user. For example, the fraud probability score is compared to a threshold value or compared to different ranges of fraud probability scores. If the fraud probability score is lower than the threshold value or falls within a low range of fraud probability scores, the connection request is communicated to the target user. However, if the fraud probability score equals or exceeds the threshold value or falls within other ranges of fraud probability scores, one or more remedial actions may be taken. Examples of actions taken by the social networking system include: warning the target user of the suspected imposter, blocking the connection request, notifying the requesting user that the connection request was blocked, warning users connected to both the target user and to the requesting user that the requesting user may be an imposter, warning the user connected to the target user likely to be impersonated that another user may be impersonating them, including the requesting user's account in an account verification process, and/or deleting the requesting user's account. In one embodiment, one or more actions taken by the social networking system are determined based on the fraud probability score falling within certain ranges of fraud probability scores, with each range associated with one or more of actions, such as those described above. If ranges overlap, the social networking system may take one or more actions associated with the ranges.

System Architecture

FIG. 1 is a high level block diagram illustrating a system environment 100 for a social networking system 140. The system environment 100 comprises one or more client devices 110, a network 120, one or more third-party websites 130, and a social networking system 140. In alternative configurations, different and/or additional components may be included in the system environment 100. The embodiments described herein can be adapted to online systems that are not social networking systems.

The client devices 110 comprise one or more computing devices capable of receiving user input as well as transmitting and/or receiving data via the network 120. In one embodiment, a client device 110 is a conventional computer system, such as a desktop or laptop computer. In another embodiment, a client device 110 may be a device having computer functionality, such as a personal digital assistant (PDA), mobile telephone, smart-phone or similar device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) that runs on the native operating system of the client device 110, such as IOS® or ANDROID™.

The client devices 110 are configured to communicate via the network 120, which may comprise any combination of local area and/or wide area networks, using both wired and wireless communication systems. In one embodiment, the network 120 uses standard communications technologies and/or protocols. Thus, the network 120 may include communication channels using technologies such as Ethernet, 802.11, worldwide interoperability for microwave access (WiMAX), 3G, 4G, CDMA, digital subscriber line (DSL), etc. Similarly, the networking protocols used on the network 120 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). The third party website 130 may be coupled to the network 120 for communicating with the social networking system 140, which is further described below in conjunction with FIG. 2.

Figure 2:
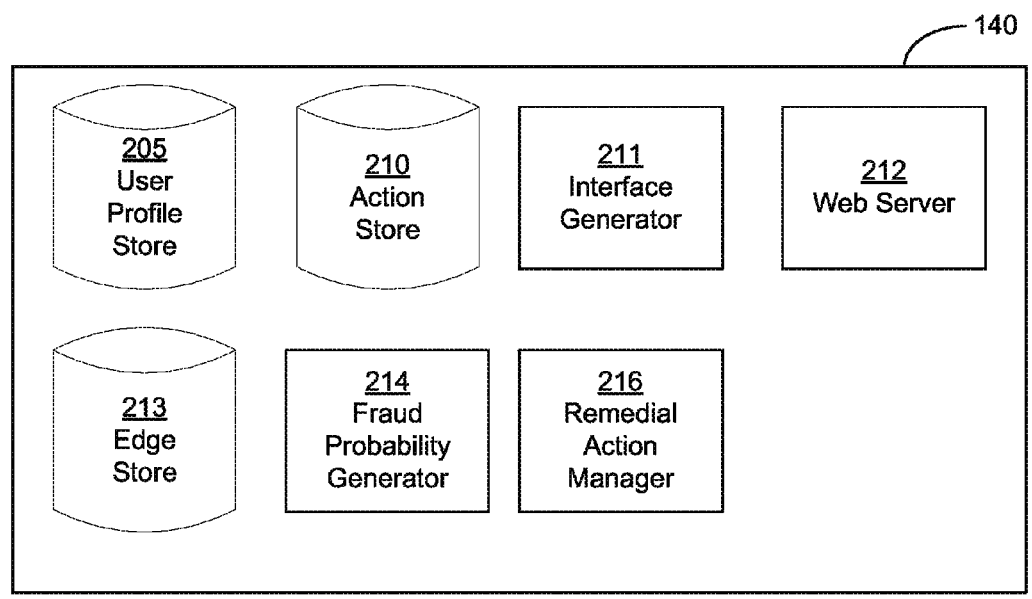
FIG. 2 is a block diagram of a social networking system, in accordance with an embodiment of the invention.

FIG. 2 is a block diagram of an example architecture of the social networking system 140. The social networking system 140 includes a user profile store 205, an action store 210, an interface generator 211, a web server 212, an edge store 213, a fraud probability generator 214, a machine-learning module 215, and a remedial action manager 216. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user account, which is typically associated with a single user profile stored in the user profile store 205. A user profile includes declarative information about the user that was explicitly shared by the user, and may also include profile information inferred by the social networking system 140. A user profile may include multiple data fields, each data field describing one or more attributes of the corresponding user of the social networking system 140. The user profile information stored in the user profile store 205 describes the users of the social networking system 140, including biographic, demographic, and other types of descriptive information, such as work experience, educational history, gender, hobbies or preferences, location and the like and may also include data describing or more relationships between a user and other users. A user profile store 205 may also store other information provided by the user, for example, images or videos. A user profile in the user profile store 205 may also maintain references to actions by the corresponding user stored in the action store 210.

While user profiles in the user profile store 205 are frequently associated with individuals, allowing people to interact with each other via the social networking system 140, user profiles may also be stored for entities such as businesses or organizations. This allows an entity to establish a presence on the social networking system 140 for connecting and exchanging content with other social networking system users. While an administrator or individual associated with the entity creates the user profile for the entity, the entity is identified as the account-hold associated with the user profile. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The user profile associated with an account includes information describing a user's identity, allowing the user's identity to be associated with a user account associated with the user profile. For example, the real name of an individual, celebrity or organization is included in a user profile. The social networking system 140 may prevent a user account from impersonating or replicating other social networking system users through their user profiles. Various methods further described below may be used to verify user accounts maintained by the social networking system 104. Additionally, if the social networking system 140 receives a report that a user account is impersonating another user account an account verification process may be initiated to verify the identity associated with the user account. Account verification is further described below in conjunction with FIG. 3.

The social networking system receives communications about user actions on and/or off the social networking system 140, populating the action store 210 with information about user actions. Such actions may include, for example, adding a connection to another user, sending a message to another user, uploading an image, reading a message from another user, viewing content associated with another user, attending an event posted by another user, or any other suitable actions. These actions are stored in the action store 210.

User actions on the social networking system 140, as well as on third party websites 130 that communicate information to the social networking system 140 are stored in action store 210. Users may interact with various objects on the social networking system 140, including commenting on posts, sharing links, and checking-in to physical locations via a mobile device or other interactions. Information describing these actions is stored in the action store 210. Additional examples of interactions with objects on the social networking system 140 included in the action store 210 include commenting on a photo album, communications between users, becoming a fan of a musician, adding an event to a calendar, joining groups, becoming a fan of a brand page, creating an event, authorizing an application, using an application and engaging in a transaction.

The edge store 213 includes information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Generally, establishing a connection to a user in a social networking system 140 allows access to more information about the user to which the connection was established than would be available to unconnected users. For example, although privacy settings limit access to information in a user profile, when an additional user establishes a connection with the user, the additional user may access an increased amount of information in the user profile. Other edges are generated when users interact with objects in the social networking system 140, such as expressing interest in a page on the social networking system 140, sharing a link with other users of the social networking system, and commenting on posts made by other users of the social networking system 140. These edges may be visible to other social networking system users. Multiple interactions between a user and an object may be stored in a single edge in the edge store 213. In other embodiments, each interaction between a user and an object is stored as a separate edge. In some embodiments, connections between users may be stored in the user profile store 205, or the user profile store 205 may access the edge store 213 to determine connections between users.

The interface generator 211 allows a social networking system user to interact with the social networking system 140. For example, the interface generator 211 generates one or more web pages including content from the social networking system 140, such as images, video, profile information, or other data. The interface generator 211 also generates one or more interfaces allowing the social networking system 140 to request information from users and for users to provide information to the social networking system 140 via a client device 110 and the network 120. For example, the interface generator 211 may creates a form for a user to provide biographic information, such as the user's age, for use by the social networking system 140 for creating a user profile. When other users request a user's profile page, the interface generator 211 retrieves data from the profile store 205 and generates a representation of the information in the user profile for display on the client device 110.

The web server 212 links the social networking system 140 via the network 120 to the one or more client devices 110, as well as to the one or more third party websites 130. The web server 212 serves web pages, as well as other web-related content, such as JAVA®, FLASH®, XML and so forth. The web server 212 may provide the functionality of receiving and routing messages between the social networking system 140 and the client device 110, for example, instant messages, queued messages (e.g., email), text and SMS (short message service) messages, or messages sent using any other suitable messaging technique. A user may send a request to the web server 212 to upload information, for example, images or videos. Additionally, the web server 212 may provide API functionality to send data directly to native client device operating systems, such as IOS®, ANDROID™, WEBOS® or RIM.

The fraud probability generator 214 compares user profile information associated with a user from which a connection request is received (the "requesting user") to user profile information associated with other users connected to a target user identified by the connection request. Based on the comparisons, the fraud probability generator 214 generates a fraud probability score indicating a likelihood that the requesting user is impersonating another user connected to the target user. The fraud probability generator 214 retrieves user profile information for the requesting user from the user profile 205 and identifies users connected to the target user from the edge store 213. User profiles for the users connected to the target user are retrieved from the user profile store 205 and compared to the user profile of the requesting user to determine the likelihood that the requesting user is impersonating a user connected to the target user. Generation of the fraud probability score is further described below in conjunction with FIG. 3.

The remedial action manager 216 compares the generated fraud probability score for the requesting user to a threshold value to determine if the requesting user is likely to be impersonating a user connected to the target user. The threshold value specifies a minimum likelihood of impersonation to be reached before a remedial action is identified and taken by the remedial action manager 216. In one embodiment, the social networking system 140 specifies the threshold value based on a global policy, or the threshold value may be set based on other factors assessed by the social networking system 140, such as demographics of the requesting user, demographics of the users connected to the target user, etc. The threshold value may be modified over time by the remedial action manager 216 based on received data and/or other factors. If the fraud probability score equals or exceeds the threshold value, the remedial action manager 216 performs one or more actions to mitigate the risk to the target user by the requesting user. Examples of actions performed by the remedial action manager 216 include warning the target user of the suspected imposter, blocking the connection request, notifying the requesting user that the connection request was blocked, warning users connected to both the target user and to the requesting user that the requesting user may be an imposter, warning the user connected to the target user likely to be impersonated that another user may be impersonating them, including the requesting user's account in an account verification process, and/or deleting the requesting user's account.

User Account Verification

Figure 3:
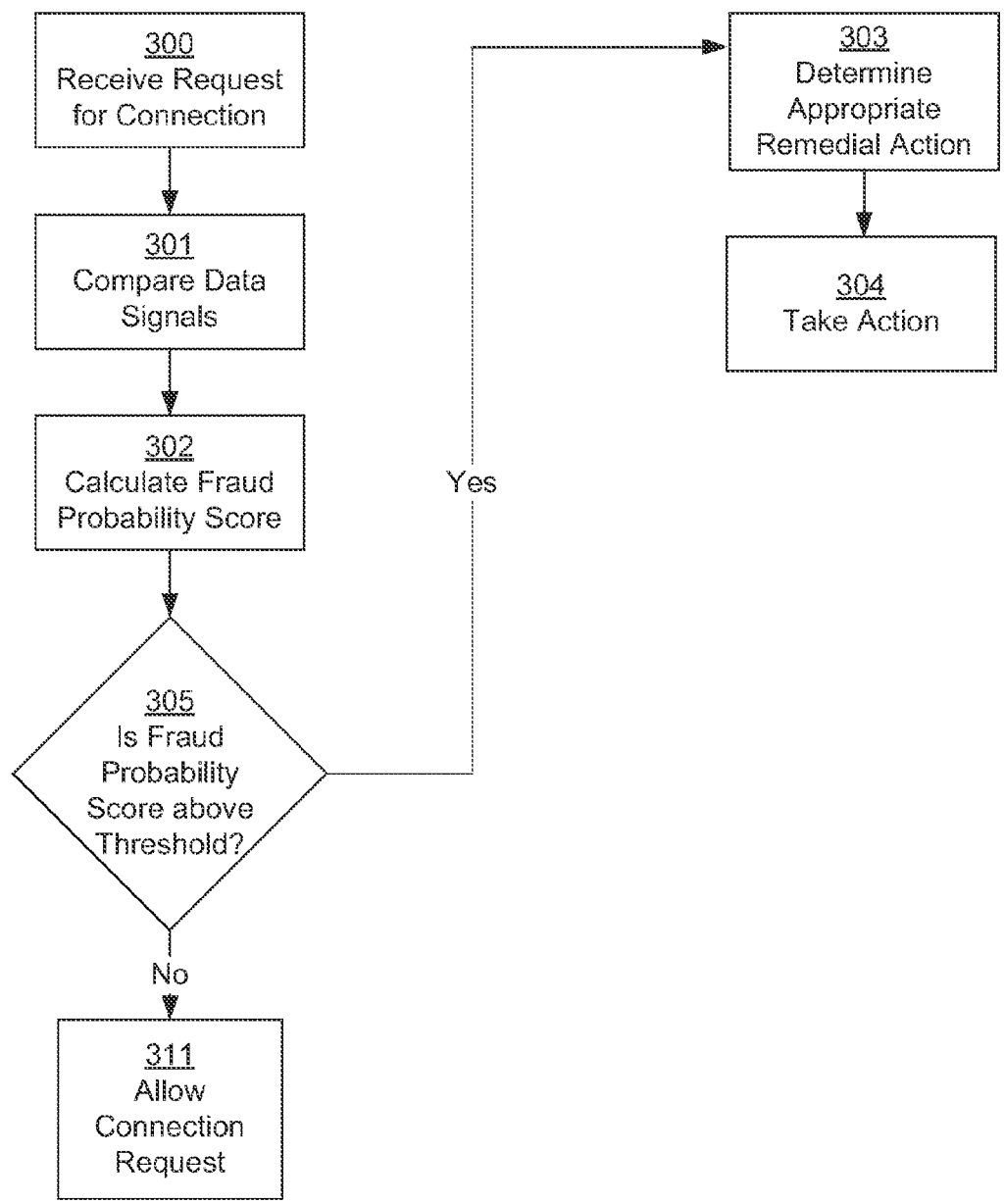
FIG. 3 is a flow chart of a method for detecting and addressing an imposter account, in accordance with an embodiment of the invention.

FIG. 3 shows an embodiment of a method for detecting and addressing an imposter account. The social networking system 140 receives 300 a request from a requesting user to establish a connection to a target user, and the fraud probability generator 214 retrieves a user profile associated with the requesting user from the user profile store 250. Additionally, users connected to the target user are identified from the edge store 213 and user profiles associated with the users connected to the target user are retrieved from the user profile store 205. In some embodiments, additional data associated with the requesting user and the users connected to the target user may be retrieved from the edge store 213 and the action store 210. The fraud probability generator 214 compares 301 information associated with the requesting user to information associated with users connected to the target user. For example, a user profile associated with the requesting user is compared 301 to user profiles associated with users connected to the target user. Based on similarities between the user profile and/or other data associated with the requesting user and the user profiles and/or other data associated with users connected to the target user, the fraud probability generator 214 calculates 302 a fraud probability score for the requesting user. The fraud probability score provides a measure of the probability that the requesting user is a duplicate of a user connected to the target user. In some embodiments, similarities between the requesting user and the user profiles and/or other data associated with users connected to the target user is also used to calculate 302 the fraud probability score for the requesting user.

Examples of information used to calculate 320 the fraud probability score include information stored in user profiles (such as name, profile picture, age, etc.), as well as information ascertained by fraud probability score from information associated with the requesting user and users connected to the target user (such as the user's IP address, login location, etc.). The fraud probability generator 214 may assign different weights to different types of data when calculating 302 the fraud probability score. For example, a higher value may be assigned identical profile pictures in the user profiles of the requesting user and a user connected to the target user than a value assigned to matching location information between user profiles of the requesting user and a user connected to the target use, as the former is more indicative of a suspected imposter than the latter.

In one embodiment, the fraud probability generator 214 uses one or more machine-learned processes to assign different weights to different types of data associated with user profiles of the requesting user and users connected to the target user. A machine-learned process may be trained to recognize characteristics of a user account likely to be a duplicate of another account based on information associated with user accounts by the social networking system 140. For example, a signal that a requesting user consistently accesses the social networking system 140 from a location different from a location indicated in a user profile associated with the requesting user as the requesting user's current location may indicate a high probability that the requesting user is duplicating information associated with another user. In contrast, the signal indicating the requesting user accesses the social networking system 140 from a login location matching a location indicated in a user profile associated with the requesting user indicates a low probability that the requesting user is duplicating information from another user. Different machine-learned processes may be used to calculate 302 fraud probability scores based on the types of available information associated with users. Additionally, if the fraud probability generator 214 detects that a user account has recently been positively verified through account verification, the fraud probability generator 214 may prevent the verified user account from being analyzed for a specified period of time.

In one embodiment, the fraud probability score is calculated 302 data associated with the user profile of the requesting user and data associated with the user profiles of the users connected to the target user. For example, the fraud probability score is calculated 302 based on information common to both the requesting user and to a user connected to the target user, such as information indicating the same name, same hometown, same current location, or other matching information. In another embodiment, the fraud probability score is calculated 302 from both matching and non-matching data. For example, the fraud probability score accounts for differing information associated with the user profiles of the requesting user and of users connected to the target user, such as differing profile pictures, workplaces, and political views.

The remedial action manager 216 uses the generated fraud probability score to determine 305 whether the requesting user is likely to be impersonating another user and to identify an action to be taken. In one embodiment, the remedial action manager 216 determines 305 if the fraud probability score equals or exceeds a threshold value that specifies a minimum probability that the requesting user is duplicating information associated with a user connected to the target user before the requesting user is treated as a suspected imposter. The threshold value may be set to avoid any actions being taken if there is a low probability that the requesting user is impersonating a user connected to the target user. The threshold value may be set by the social networking system 140 based on a global policy, or may be set based on other factors assessed by the social networking system 140, such as demographics of the requesting user, demographics of the users connected to the target user, etc.

If the fraud probability score is less than the threshold value, the remedial action manager 216 allows 311 the connection request to be communicated to the target user 311. However, if the fraud probability score is equal to or greater than the threshold value, the remedial action manager 216 determines 303 a remedial action. Examples of remedial actions include: warning the target user of the suspected imposter, blocking the connection request, notifying the requesting user that the connection request was blocked, warning users connected to both the target user and to the requesting user that the requesting user may be an imposter, warning the user connected to the target user likely to be impersonated that another user may be impersonating them, including the requesting user's account in an account verification process, and/or deleting the requesting user's account. An example of an account verification process is further described in U.S. patent application Ser. No. 13/307,905, filed on Nov. 30, 2011, which is hereby incorporated by reference in its entirety. Blocking the connection request without notifying the requesting user likely to be impersonating a user connected to the target user does not notify the suspected imposter to the extent mimicking another user's profile triggers remedial action. Blocking a connection request without notifying the requesting user further described in U.S. patent application Ser. No. 13/308,469, filed on Nov. 30, 2011, which is hereby incorporated by reference in its entirety.

In one embodiment, the target user, users connected to the requesting user likely to be impersonating another user and to the target user, and/or the user likely to be impersonated by the requesting user may be warned about the suspected impersonation in a variety of ways. Examples of user notifications include a visual user interface on a web page hosted by the social networking system 140, a link in an email message, an instant message, or any other suitable messaging technique. In one embodiment, when users are warned of the suspected imposter, the remedial action manager 216 may present the warned users with options for further action. For example, the warning message sent to users is interactive and allows the users to select one or more options including warning other users, allowing them to answer questions to verify the suspected imposter's identity, and reporting the suspected imposter to the social networking system 140 for review in the account verification process.

In one embodiment, the remedial action manager 216 compares the fraud probability score to different ranges of fraud probability scores 303, each associated with one or more actions. If the fraud probability score falls within a low range, the connection request is communicated to the target user. If the fraud probability score falls within other ranges, an action, such as those described above, associated with the range including the fraud probability score is taken 304. In one embodiment, one or more of the ranges may overlap, allowing more than one action to be taken 304. The actions corresponding to different ranges may be set by the social networking system 140 based on a global policy, or they may be set based on other factors assessed by the social networking system 140, such as demographics of the requesting user, demographics of the users connected to the target user, etc.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by a server of a social networking system, a request from a client device of a requesting user of the social networking system to establish a connection to a target user of the social networking system;
   retrieving a user profile associated with the requesting user including information identifying characteristics of the requesting user and information for identifying users of the social networking system connected to the requesting user;

retrieving a user profile associated with the target user including information identifying characteristics of the target user and information for identifying users of the social networking system connected to the target user;

comparing data from the user profile associated with the requesting user with data from user profiles associated with one or more users of the social networking system connected to the target user;

calculating a fraud probability score based on the comparison, the fraud probability score indicating a likelihood that the requesting user is a duplicate of a user of the social networking system connected to the target user; and performing, using at least one processor, an action affecting the request to establish the connection based on the fraud probability score.

2. The method of claim 1, wherein performing the action affecting the request to establish the connection based on the fraud probability score comprises:

comparing the fraud probability score with a plurality of ranges of fraud probability scores, each range of fraud probability scores associated with an action; and selecting an action corresponding to a range of fraud probability scores that includes the fraud probability score.

3. The method of claim 1, wherein calculating the fraud probability score based on the comparison comprises:

associating weights with different information in the user profile associated with the requesting user and with data from the user profiles associated with the one or more users of the social networking system connected to the target user; and determining the fraud probability score based on weights associated with information in the user profile associated with the requesting user matching data in a user profile associated with the one or more users of the social networking system connected to the target user.

4. The method of claim 1, wherein calculating the fraud probability score based on the comparison comprises:

associating weights with different information in the user profile associated with the requesting user and with data from the user profiles associated with the one or more users of the social networking system connected to the target user; and determining the fraud probability score based on weights associated with information in the user profile associated with the requesting user matching from data in a user profile associated with the one or more users of the social networking system connected to the target user and based on weights associated with information in the user profile associated with the requesting user differing from data in a user profile associated with the one or more users of the social networking system.

5. The method of claim 1, wherein data from the user profile associated with the requesting user includes geographical location data associated with a location from which the requesting user transmitted the request.

6. The method of claim 1, wherein the action comprises transmitting a warning to the target user indicating that the requesting user may be an imposter of a user connected to the target user.

7. The method of claim 1, wherein the action comprises including the user profile associated with the requesting user in an identity verification process.

8. The method of claim 1, wherein the action comprises blocking communication of the request to the target user.

9. The method of claim 8, wherein the action further comprises notifying the requesting user the request was blocked.

10. The method of claim 1, wherein the action comprises transmitting a warning to one or more users connected to both the requesting user and to the target user, the warning indicating a likelihood that the requesting user is impersonating a user.

11. The method of claim 1, wherein the action comprises notifying a user of a likelihood that the requesting user is impersonating the user.

12. The method of claim 1, wherein the action comprises deleting the requesting user's account.

13. The method of claim 1, wherein the action comprises communicating the request to the target user.

14. A method comprising:

receiving, by a server of a social networking system, a request from a client device of a requesting user of the social networking system to establish a connection with a target user of the social networking system;

retrieving a user profile associated with the requesting user and describing characteristics of the requesting user, the user profile associated with the requesting user maintained by the social networking system;

identifying one or more users of the social networking system connected to the target user;

retrieving user profiles associated with the one or more users of the social networking system connected to the target user comparing characteristics of the requesting user to characteristics of one or more users of the social networking system connected to the target user from the retrieved user profiles;

calculating a fraud probability score based on the comparison, the fraud probability score indicating a probability that the requesting user is an imposter of a user connected to the target user;

performing, at least one processor, one or more actions affecting the request based on the fraud probability score if the fraud probability score is at least a threshold value.

15. The method of claim 14, wherein performing the one or more actions affecting the request based on the fraud probability score comprises:

comparing the fraud probability score with a plurality of ranges of fraud probability scores, each range of fraud probability scores associated with an action; and selecting an action corresponding to a range of fraud probability scores that includes the fraud probability score.

16. The method of claim 14, wherein calculating the fraud probability score based on the comparison comprises:

associating weights with different information in the user profile associated with the requesting user and with data from the user profiles associated with the one or more users of the social networking system connected to the target user; and determining the fraud probability score based on weights associated with information in the user profile associated with the requesting user matching data in a user profile associated with the one or more users of the social networking system connected to the target user.

17. The method of claim 14, wherein calculating the fraud probability score based on the comparison comprises:

associating weights with different information in the user profile associated with the requesting user and with data from the user profiles associated with the one or more users of the social networking system connected to the target user; and determining the fraud probability score based on weights associated with information in the user profile associated with the requesting user matching from data in a user profile associated with the one or more users of the social networking system connected to the target user and based on weights associated with information in the user profile associated with the requesting user differing from data in a user profile associated with the one or more users of the social networking system.

18. The method of claim 14, wherein data from the user profile associated with the requesting user includes geographical location data associated with a location from which the requesting user transmitted the request.

19. The method of claim 14, wherein the action comprises transmitting a warning to the target user indicating that the requesting user may be an imposter of a user connected to the target user.

20. The method of claim 14, wherein the action comprises notifying a user of a likelihood that the requesting user is impersonating the user.

21. The method of claim 14, wherein the action comprises deleting the requesting user's account.

22. The method of claim 14, wherein the action comprises including the user profile associated with the requesting user in an identity verification process.

23. The method of claim 14, wherein the action comprises transmitting a warning to one or more users connected to both the requesting user and to the target user, the warning indicating a likelihood that the requesting user is impersonating a user.

24. The method of claim 14, wherein the action comprises blocking communication of the request to the target user.

25. The method of claim 14, further comprising:
   communicating the request to the target user if the fraud probability score is less than the threshold value.

* * * * *